(12) United States Patent
Stahn et al.

(10) Patent No.: US 12,320,451 B2
(45) Date of Patent: Jun. 3, 2025

(54) METHOD FOR TREATING A PIPE, PIPE AND PIPE CONNECTION DEVICE

(71) Applicant: TI Automotive (Heidelberg) GmbH, Heidelberg (DE)

(72) Inventors: Andreas Stahn, Rauenberg (DE); Georg Weick, Plankstadt (DE)

(73) Assignee: TI AUTOMOTIVE (HEIDELBERG) GMBH, Heidelberg (DE)

( * ) Notice: Subject to any disclaimer, the term of this patent is extended or adjusted under 35 U.S.C. 154(b) by 0 days.

(21) Appl. No.: 18/023,350

(22) PCT Filed: Aug. 25, 2021

(86) PCT No.: PCT/IB2021/057800
§ 371 (c)(1),
(2) Date: Feb. 25, 2023

(87) PCT Pub. No.: WO2022/043898
PCT Pub. Date: Mar. 3, 2022

(65) Prior Publication Data
US 2023/0323986 A1    Oct. 12, 2023

(30) Foreign Application Priority Data
Aug. 27, 2020  (EP) ..................................... 20193135

(51) Int. Cl.
*F16L 58/02*     (2006.01)
*F16L 19/02*     (2006.01)
(Continued)

(52) U.S. Cl.
CPC ......... *F16L 19/028* (2013.01); *F16L 19/0243* (2013.01); *B60T 17/043* (2013.01)

(58) Field of Classification Search
CPC ... F16L 19/0243; F16L 19/025; F16L 19/028; F16L 19/0286; F16L 57/00; F16L 57/005; F16L 57/06; F16L 25/023; F16L 25/021; F16L 25/02; F16L 58/00; F16L 58/02; F16L 58/04; F16L 58/10; F16L 58/1054; F16L 58/1072; F16L 58/184
See application file for complete search history.

(56) References Cited

U.S. PATENT DOCUMENTS 4,881,763 A    11/1989  Guido et al.
4,893,657 A *  1/1990  Usui ................... F16L 19/0243
                                                    285/333

(Continued)

FOREIGN PATENT DOCUMENTS

DE    3801703    *  2/1989
DE    3801703 C1    2/1989
(Continued)

OTHER PUBLICATIONS

Translation DE 3801703 (Year: 1989).*

*Primary Examiner* — Aaron M Dunwoody
(74) *Attorney, Agent, or Firm* — Dickinson Wright PLLC

(57) ABSTRACT

A method for treating a pipe, in particular a motor vehicle pipe, wherein a flare is generated at least at one pipe end of the pipe. At least areas of the flare are provided with at least one layer, which changes the friction properties of the coated surface of the flare. The flare is coated by means of plasma coating.

15 Claims, 3 Drawing Sheets

(51) Int. Cl.
*F16L 19/028* (2006.01)
*B60T 17/04* (2006.01)

(56) References Cited

U.S. PATENT DOCUMENTS

| | | | |
|---|---|---|---|
| 8,172,278 B2 | 5/2012 | Abbott et al. | |
| 2006/0091117 A1* | 5/2006 | Blankenship | B23K 10/027 219/121.47 |
| 2006/0091119 A1* | 5/2006 | Zajchowski | C23C 4/134 219/121.59 |
| 2008/0057260 A1* | 3/2008 | Buchhauser | H10K 50/841 427/58 |
| 2008/0071338 A1* | 3/2008 | Jiang | A61N 1/056 607/119 |
| 2009/0314202 A1* | 12/2009 | Zajchowski | C23C 4/04 427/446 |
| 2009/0324363 A1 | 12/2009 | Abbott et al. | |
| 2014/0001749 A1* | 1/2014 | Jensen | F16L 19/028 285/222.1 |
| 2014/0110937 A1* | 4/2014 | Okabe | F16L 19/025 285/354 |
| 2015/0354735 A1* | 12/2015 | Stahn | F16L 19/028 285/94 |
| 2016/0201841 A1* | 7/2016 | Heutchy | F16L 58/184 285/55 |
| 2018/0355829 A1* | 12/2018 | Kondo | F16L 19/0286 |
| 2020/0208763 A1* | 7/2020 | Stahn | F16L 19/0243 |
| 2020/0271251 A1* | 8/2020 | Gunji | F16L 19/0286 |
| 2023/0278088 A1* | 9/2023 | Stahn | C23C 4/18 29/460 |
| 2023/0323986 A1* | 10/2023 | Stahn | F16L 19/028 285/55 |
| 2024/0027002 A1* | 1/2024 | Stahn | F16L 19/0286 |

FOREIGN PATENT DOCUMENTS

| | | |
|---|---|---|
| DE | 4116540 A1 | 11/1991 |
| DE | 19947258 A1 | 4/2001 |
| DE | 102007012666 A1 | 9/2008 |
| DE | 102010028262 A1 | 10/2011 |
| DE | 202017104112 U1 | 7/2017 |
| DE | 102016210887 A1 | 12/2017 |
| EP | 2860433 A1 | 4/2015 |
| JP | S62195440 A | 8/1987 |
| JP | H11218269 A | 8/1999 |
| JP | 2011072966 A | 4/2011 |
| WO | 2016116558 A1 | 7/2016 |

* cited by examiner

METHOD FOR TREATING A PIPE, PIPE AND PIPE CONNECTION DEVICE

RELATED APPLICATIONS

This application is a 35 U.S.C. § 371 national phase of PCT International Application No. PCT/IB2021/057800, filed Aug. 25, 2021, which claims benefit of European Application No. 20193135.9, filed Aug. 27, 2020, the contents of which are incorporated herein by reference in their entirety.

FIELD

The disclosure relates to a method for treating a pipe, in particular a motor vehicle pipe, wherein a flare is generated at least at one pipe end of the pipe. The disclosure further relates to a corresponding pipe and a pipe connection device for connecting such a pipe. The flare of the pipe can involve in particular an F-flare or an E-flare.

BACKGROUND

Such pipes with a flare at the end are connected to a connection element or to a connection block, in particular as motor vehicle pipes. For example, the pipes are used for hydraulic fluids or brake fluids. For connection to the connection element, the pipe as a rule penetrates through an axial bore of a screw fitting, and the end face of the screw fitting acts on the rear side of the flare of the pipe. The screw fitting has a male thread, and is screwed into a corresponding female thread for connection to the connection element. While tightening the screw fitting, the front flare side of the pipe is normally pressed against a sealing surface of the connection element. As a rule, the connection element integrates an additional pipe, which aligns flush with the connected pipe. While screwing the screw fitting, we have discovered that the pipe can come to corotate, and a torsion of the pipe causes spring force to be stored in the pipe, as it were. The torsion of the pipe generates a reverse torque, which during operation can result in an undesired or uncontrolled loosening or detachment of the screwed connection. Such an undesired loosening of the screwed connection can also come about in particular due to vibrations, for example which arise in the engine compartment of motor vehicles.

Methods, pipes, and pipe connection elements of the kind described at the outset are known from practice in varying configurations. In order to reduce the disadvantages described above in conjunction with a torsion of the pipe, it is already known to correspondingly treat the flare at the pipe end and in particular the rear flare side upon which the end face of the screw fitting acts. It is thus known to remove coatings on the flare that had previously been applied to the pipe, and polish the corresponding surfaces of the flare, so as to influence the friction properties accordingly. This is intended to diminish the friction between the acting end face of the screw fitting and the rear flare side. However, we have found these known measures are associated with a series of disadvantages. On the one hand, the plurality of procedural steps makes the measures relatively complex, and thus costly. On the other hand, the elimination of coatings leads to undesired corrosion effects. In addition, the quality of the processed surface depends upon a multitude of parameters, and the surfaces can thus not be reproducibly set or adjusted. As a consequence, we have discovered the functional reliability of the screwed connection is not always ensured.

SUMMARY

By contrast, the disclosure is based upon the technical problem of indicating a method of the kind mentioned at the outset, with which the disadvantages described above can be easily and effectively avoided. The disclosure is further based upon the technical problem of indicating a corresponding pipe and a corresponding pipe connection device.

In order to solve this technical problem, the disclosure instructs a method for treating a pipe—in particular a motor vehicle pipe—, wherein a flare is generated at least at one pipe end of the pipe, wherein at least areas of the flare are provided with at least one layer, which changes the friction properties of the coated surface of the flare, and wherein the flare is coated by means of plasma coating. The flare is advantageously integrally molded to the pipe at the pipe end, or is formed out of the pipe.

It lies within the framework of the disclosure that at least areas of the rear flare side that faces the pipe are provided with a layer or with a first layer via plasma coating, wherein this layer or first layer has a friction value $\mu 1$. Advantageously at least 50%, in particular at least 60%, of the surface of the rear flare side is provided with the layer or first layer via plasma coating. It further lies within the framework of the disclosure that this layer or first layer applied via plasma coating has a small friction value or a very small friction value. This makes it possible to ensure that a torsion of the pipe can be avoided or largely avoided while tightening or screwing down a screw fitting that acts on the rear flare side with its end face. In such an embodiment with a screw fitting, advantageously the end face of the screw fitting is also provided with a layer with a small friction value, wherein this layer can likewise be preferably applied via plasma coating. In a preferred embodiment of the disclosure, the thread or male thread of the screw fitting is also coated in the embodiment with a screw fitting, specifically and preferably with a layer with a larger friction value or with a friction value that is higher than the friction value $\mu 1$ of the layer on the rear flare side. The friction value of the layer on the thread or male thread of the screw fitting is preferably three times, in particular at least four times, and very preferably at least five times as large as the friction value $\mu 1$ of the layer or first layer on the rear flare side. It furthermore lies within the framework of the disclosure that the layer on the thread or male thread of the screw fitting is also applied by means of plasma coating. Plasma coating has proven to be especially effective for the application of coatings with varying friction values.

The disclosure is based upon the discovery that the plasma coating according to the disclosure can be used to set the friction value of the rear flare side in a targeted and very functionally reliable manner, and above all reproducibly as well. Damage to the pipe and any coatings that might be present on the pipe can be completely avoided, so that no signs of corrosion known from prior art are encountered either. Above all, the layer with a small friction value can be applied via plasma coating very easily and inexpensively. The method according to the disclosure eliminates a plurality of procedural steps and the outlay associated therewith.

In one embodiment of the disclosure, at least areas of the front flare side that faces away from the pipe and forms an end face of the pipe can be provided with a layer or with a second layer via plasma coating, and this layer or second layer has a friction value $\mu 2$. This friction value $\mu 2$ is advantageously larger or distinctly larger than the friction value $\mu 1$ of the layer or first layer applied to the rear flare side.—In an embodiment of the method according to the disclosure, a first layer with a friction value µ1 is applied at least in areas to the flare by means of plasma coating, in particular on the rear flare side, and a second layer with a friction value µ2 is applied at least in areas to the flare by means of plasma coating, in particular on the front flare side. The second friction value µ2 is here larger than the first friction value µ1. Advantageously the second friction value µ2 is at least three times, in particular at least four times, and preferably at least five times larger than the first friction value µ1, which is preferably to be allocated to the layer on the rear flare side.

In a recommended embodiment of the disclosure, the flare at the pipe end involves an F-flare or an E-flare. Within the framework of the disclosure, an F-flare is especially preferred.—It is best to use a pipe that consists of metal or essentially consists of metal. It lies within the framework of the disclosure that the flare—in particular the F-flare—is integrally molded to the pipe or to the pipe end, and likewise consists of metal or essentially consists of metal.

It lies within the framework of the disclosure that the surface to be coated via plasma coating is initially cleaned, and preferably cleaned by means of a plasma jet. This embodiment has proven especially effective within the framework of the disclosure. Advantageously in particular the rear flare side of the flare of the pipe is cleaned by means of a plasma jet before the layer with the friction value µ1 is applied to this rear flare side or to the surface of the rear flare side by means of plasma coating.

An especially recommended embodiment of the method according to the disclosure is characterized in that the at least one layer applied via plasma coating consists or essentially consists at least of one material or at least of one substance from the "metal; metal salt; polymer" group. It is recommended that the layer to be applied to the surface of the rear flare side consists or at least essentially consists of at least one material from the mentioned group. In particular fluoropolymers, polyolefins and/or polyamides are here used as the polymers. It is recommended that the layer with a small friction value to be applied by means of plasma coating has at least one lubricant that lowers the friction value of the layer, with this lubricant preferably being a fluoropolymer, in particular polytetrafluoroethylene (PTFE) and/or molybdenum sulfide ($MoS_2$). This layer with this lubricant is advantageously applied to the surface of the rear flare side by means of plasma coating. The layer to be applied by means of plasma coating can basically consist or essentially consist of various organic and/or organometallic compounds and/or mixtures thereof.

It lies within the framework of the disclosure that plasma coating is performed at normal pressure or at atmospheric pressure. Plasma coating can basically also take place at other pressures, for example in a vacuum. However, plasma coating at normal pressure is preferred. Plasma coating is advantageously performed as a physical vapor deposition and/or as a chemical vapor deposition.

It lies within the framework of the disclosure that a plasma coating device is used for plasma coating, and that the material for coating is fed to the plasma coating device as a powder. Advantageously the material for coating in the plasma coating device is converted into the gas phase, and is then deposited in a solid form onto at least areas of the flare of the pipe—in particular onto the rear flare side of the pipe.

In order to solve the technical problem, the disclosure also instructs a pipe, preferably a motor vehicle pipe, wherein a flare is present at least at one pipe end of the pipe, and wherein at least areas of the flare are provided with at least one layer applied by means of plasma coating. Advantageously at least areas of the rear flare side are provided with at least one layer applied by means of plasma coating, wherein this layer advantageously has a small or a very small friction value.

In order to solve the technical problem, the disclosure further instructs a pipe connection device for connecting pipes, in particular motor vehicle pipes, with at least one pipe and with at least one screw element, in particular a screw fitting, wherein at least one of the surfaces of the screw element is in contact with a plasma-coated flare surface. The screw element or the screw fitting is preferably in contact with the plasma-coated rear flare side. It lies within the framework of the disclosure that at least areas of the screw element or the screw fitting have a coating, in particular a coating of the thread or male thread, and that the friction value µ3 of the thread coating is higher, and preferably significantly higher, than the friction value µ1 of the layer applied via plasma coating on the rear flare side of the flare of the pipe. The friction value µ3 of the thread coating is advantageously at least twice as high, in particular at least three times as high, preferably at least four times as high and very preferably at least five times as high as the friction value µ1 of the layer applied via plasma coating on the rear flare side of the flare.

The disclosure is based upon the knowledge that the flare of the pipe, in particular the rear flare side of the flare, can be coated in an especially easy and inexpensive manner, and that a defined friction value for the layer can here simultaneously be reproducibly set. Disadvantageous damage to the flare surface or pipe surface is here not encountered. As a result, signs of corrosion can be avoided, as opposed to the measures known from prior art. Distinctly fewer procedural steps are required for the method according to the disclosure than for the measures known from prior art or practice. In this regard, the manufacturing time for the pipes according to the disclosure is significantly lower and manufacturing is less complicated and less expensive. An optimal surface quality of the coated flare is obtained, and this surface quality can also be reproducibly generated. As a whole, the disclosure is characterized by simplicity, little effort, and low costs. Let it be emphasized that disadvantageous torsions of the pipe can be very effectively avoided with the flares coated according to the disclosure, so that disruptive reverse torques of the pipes are quasi not encountered.

BRIEF DESCRIPTION OF THE DRAWINGS

The disclosure will be described in more detail below based upon a drawing that only illustrates an exemplary embodiment. Shown schematically on.

DETAILED DESCRIPTION

Figure 1:
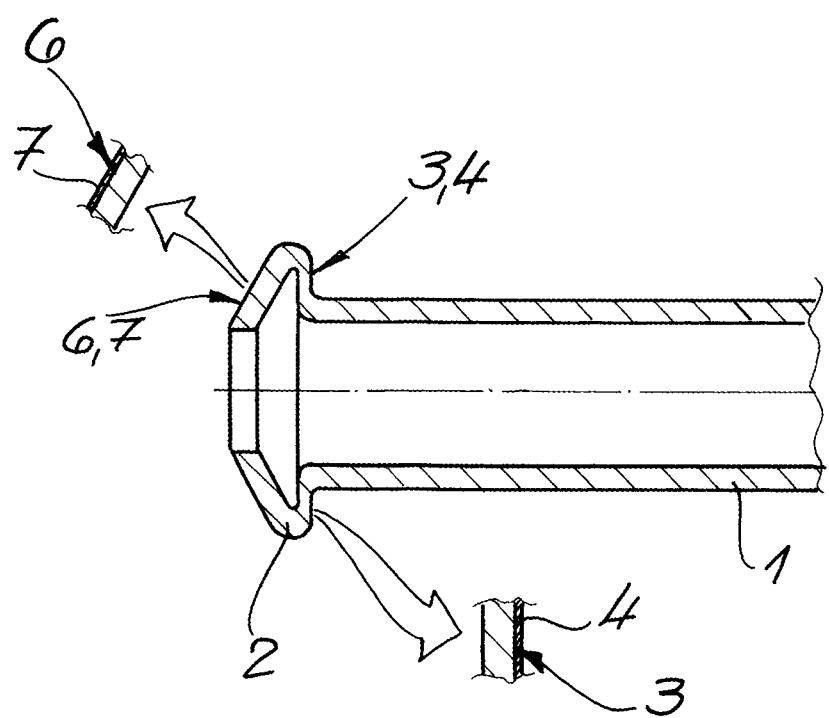
FIG. 1 is a sectional view of a pipe according to the disclosure with a flare coated according to the disclosure.

FIG. 1 shows a pipe 1 according to the disclosure treated based on the method according to the disclosure. In a preferred embodiment and in the exemplary embodiment, the pipe 1 is a motor vehicle pipe. Present at one pipe end of this pipe 1 is a flare 2, which preferably and in the exemplary embodiment is designed as an F-flare. In an especially recommended configuration and in the exemplary embodiment, the rear flare side 3 of the flare 2 is provided with a first layer 4, which preferably has a small friction value μ1. The layer present on the rear flare side 3 was applied according to the disclosure via plasma coating, specifically and preferably with a plasma coating device 5 shown on FIG. 3.

In the exemplary embodiment according to FIG. 1, the front flare side 6 that forms an end face of the pipe 1 is provided with a second layer 7, which has a friction value μ2. Advantageously this second layer 7 is also applied with the help of a plasma coating. It lies within the framework of the disclosure that the friction value μ2 of this second layer 7 is larger and preferably significantly larger than the friction value μ1 of the first layer on the rear flare side 3. In the exemplary embodiment, the friction value μ2 can be three times as large as the friction value μ1.—The pipe 1 advantageously consists of metal, and the flare 2 or F-flare likewise consists of metal, and is preferably integrally molded onto the pipe 1.

Figure 2:
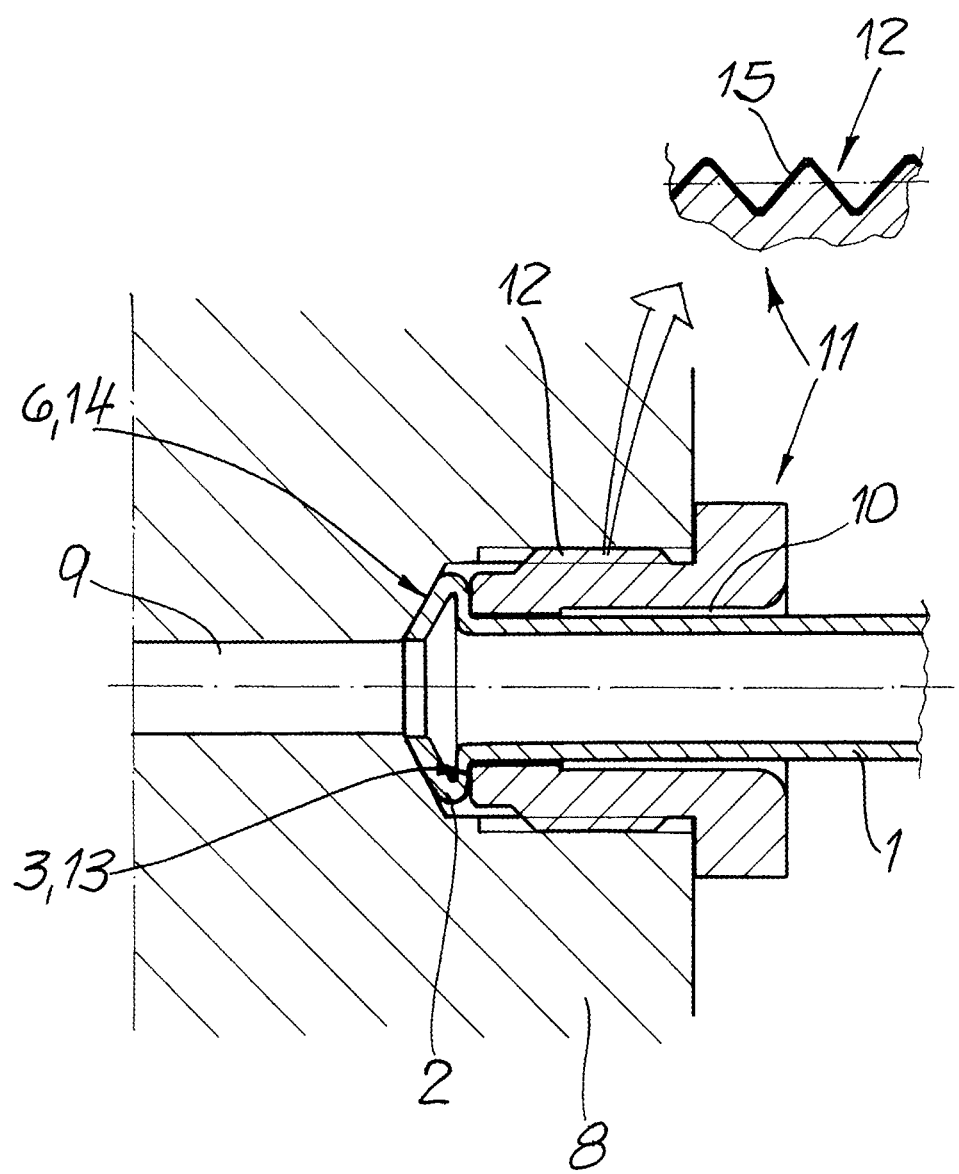
FIG. 2 is a sectional view of a pipe connection device with the subject matter according to FIG. 1.

FIG. 2 shows an exemplary embodiment of a pipe connection device according to the disclosure with a connected pipe 1 according to FIG. 1. In the exemplary embodiment according to FIG. 2, the pipe 1 is preferably connected to a connection element or to a connection block 8, wherein this connection block 8 best has an integrated second pipe 9 in the exemplary embodiment. In the exemplary embodiment, the pipe penetrates an axial bore 10 of a screw fitting 11, wherein this screw fitting 11 has a male thread 12. In the exemplary embodiment according to FIG. 2, the screw fitting 11 is screwed into a corresponding complementary female thread with its male thread 12. In this screwed in state, the end face 13 of the screw fitting 11 acts on the rear flare side 3 of the flare 2. The screw fitting 11 presses the flare 2 or the front flare side 6 against a sealing surface 14 of the connection block 8.

The first layer 4 on the rear flare side 3 with the small friction value μ1 diminishes the friction between the end face 13 of the screw fitting 11 and the rear flare side 3, making it possible to effectively prevent a torsion of the pipe 1 in this way. The disclosure is based upon the knowledge that coating the rear flare side 3 with the first layer 4 by means of plasma coating here leads to especially advantageous results.—In one embodiment and in the exemplary embodiment according to FIG. 2, the male thread 12 of the screw fitting 11 has a third layer 15, which has a friction value μ3. In the exemplary embodiment, this friction value μ3 of the third layer 15 is preferably larger, and especially preferably distinctly larger, than the friction value μ1 of the first layer 4 on the rear flare side 3. In the exemplary embodiment, the friction value μ3 of the layer 15 on the male thread 12 of the screw fitting 11 can be at least three times as large as the friction value μ1 of the first layer on the rear flare side 3. Furthermore, it also lies within the framework of the disclosure that the end face 13 of the screw fitting 11 is provided with a layer that has a small friction value. The same layer that was also applied to the rear flare side 3 can basically be involved here. It further lies within the framework of the disclosure that the coating on the end face 13 of the screw fitting 11 likewise is applied via plasma coating. The third layer 15 on the male thread 12 of the screw fitting 11 with the high friction value μ3 can basically also be applied via plasma coating. The disclosure is based upon the knowledge that the friction value of the layers can be set in an especially targeted and precise manner when applying the layers via plasma coating.

Figure 3:
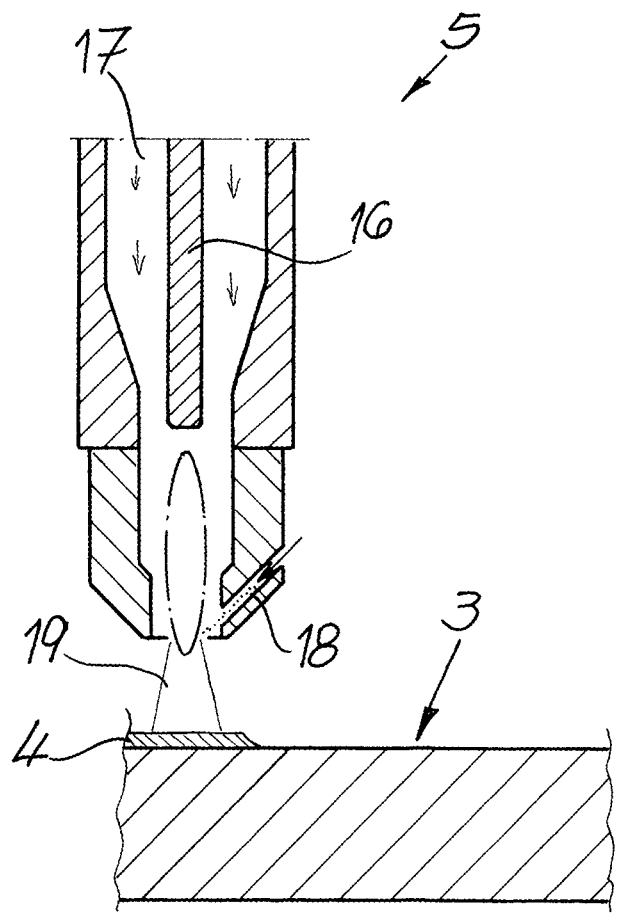
FIG. 3 is a schematic view of a plasma coating device suitable for the method according to the disclosure.

FIG. 3 shows a plasma coating device 5 that is preferably used for implementing the method according to the disclosure. FIG. 3 shows the coating of the rear flare side 3 with the first layer 4 via plasma coating. In a known manner, the plasma coating device 5 has an electrode 16 as well as a gas supply line 17. Otherwise provided is a channel 18, through which the material for plasma coating is preferably introduced as a powder. Also shown is the plasma jet 19 for coating the rear flare side 3.

The invention claimed is:

1. A method for treating a pipe comprising the steps, generating a flare at least at one pipe end of the pipe, and plasma coating areas of the flare with at least one layer, which changes the friction properties of the coated surface of the flare;
wherein a first layer with a friction value μ1 is applied at least in areas to the flare by means of plasma coating, and a second layer with a friction value μ2 is applied at least in areas to the flare by means of plasma coating, and that the second friction value μ2 is larger than the first friction value μ1.

2. The method according to claim 1, wherein at least areas of a rear flare side that faces the pipe are provided with the first layer via plasma coating.

3. The method according to claim 1, wherein at least areas of a front flare side that faces away from the pipe and forms an end face of the pipe are provided with the second layer via plasma coating.

4. The method according to claim 1, wherein the flare is generated as an F-flare.

5. The method according to claim 1, wherein a pipe is used that consists of metal or essentially consists of metal.

6. The method according to claim 1, wherein the at least one layer applied via plasma coating consists or essentially consists at least of one material from the "metal; metal salt; polymer, fluoropolymer" group.

7. The method according to claim 1, wherein plasma coating is performed at normal pressure or at atmospheric pressure.

8. The method according to claim 1, wherein plasma coating is performed as a physical vapor deposition and/or as a chemical vapor deposition.

9. The method according to claim 1, wherein a plasma coating device is used for plasma coating, and that the material for coating is fed to the plasma coating device as a powder.

10. The method according to claim 1, wherein the material for coating in the plasma coating device is converted into the gas phase, and then deposited in a solid form onto at least areas of the flare of the pipe.

11. A pipe treated according to claim 1, wherein a flare is present at least at one pipe end, wherein at least areas of the flare are provided with at least one layer applied by means of plasma coating.

12. A pipe connection device for connecting pipes, with at least one pipe treated according to claim 1, and with at least one screw element forming a screw fitting, wherein at least one of the surfaces of the screw element is in contact with a plasma-coated flare surface.

13. The pipe connection device according to claim 12, wherein the screw element is in contact with a rear flare side that is plasma-coated.

14. The pipe connection device according to claim 12, wherein at least areas of the screw element have a thread coating, and wherein the friction value μ3 of the thread coating is higher than the friction value μ1 of the layer applied via plasma coating on the rear flare side.

15. The method according to claim 1, wherein at least areas of a rear flare side that faces the pipe are provided with a first layer having a friction value µ1, and wherein at least areas of a front flare side that faces away from the pipe are provided with a second layer having a friction value µ2, and wherein the second friction value µ2 is larger than the first friction value µ1.

* * * * *